United States Patent
Hagimoto et al.

(10) Patent No.: US 9,623,929 B2
(45) Date of Patent: Apr. 18, 2017

(54) ENGINE SUPPORTING STRUCTURE FOR SADDLE-RIDE TYPE VEHICLE

(71) Applicant: HONDA MOTOR CO., LTD., Tokyo (JP)

(72) Inventors: Masashi Hagimoto, Wako (JP); Masanori Usa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/273,910

(22) Filed: May 9, 2014

(65) Prior Publication Data

US 2015/0000992 A1 Jan. 1, 2015

(30) Foreign Application Priority Data

Jun. 26, 2013 (JP) .................................. 2013-134061

(51) Int. Cl.
*B62K 11/04* (2006.01)
(52) U.S. Cl.
CPC .................................... *B62K 11/04* (2013.01)
(58) Field of Classification Search
CPC ....................................................... B62K 11/04
See application file for complete search history.

(56) References Cited

U.S. PATENT DOCUMENTS

| | | | | |
|---|---|---|---|---|
| 4,727,953 A | * | 3/1988 | Kudo | ..................... B62K 11/04 180/219 |
| 2008/0110688 A1 | * | 5/2008 | Miyashiro | ............. B62K 25/283 180/311 |
| 2011/0073398 A1 | * | 3/2011 | Yokoyama | ............. B62K 11/04 180/219 |
| 2012/0187654 A1 | * | 7/2012 | Kawai | ................... B60T 8/3685 280/288.4 |

FOREIGN PATENT DOCUMENTS

| | | |
|---|---|---|
| CN | 2671938 Y | 1/2005 |
| JP | 3-10990 U | 2/1991 |
| JP | 2012-236467 A | 12/2012 |

* cited by examiner

*Primary Examiner* — Tony Winner
*Assistant Examiner* — Felicia L Brittman
(74) *Attorney, Agent, or Firm* — Squire Patton Boggs (US) LLP

(57) ABSTRACT

An engine supporting structure for a saddle-ride type vehicle is configured such that an engine is supported from above in substantially a center position between a head pipe and a pivot in a side view, on a pair of right and left main frames that are branched to right and left from the head pipe and that extend rearward. Only inner surfaces in a vehicle width direction of the right and left main frames are formed with a pair of left front mounting portions and a pair of right rear mounting portions, that project inward in the vehicle width direction, respectively, the front mounting portions and the rear mounting portions are mounted with engine hangers that extend downward, and the engine is supported through the engine hangers.

20 Claims, 10 Drawing Sheets

ENGINE SUPPORTING STRUCTURE FOR SADDLE-RIDE TYPE VEHICLE

BACKGROUND

Field

Embodiments of the present invention relate to an engine supporting structure for a saddle-ride type vehicle.

Description of the Related Art

In the existing engine supporting structure for a saddle-ride type vehicle, such a structure that an engine hanger for supporting an engine on a frame is provided on an inner surface of the frame has been known in JP-U No. H3-10990 (Patent Literature 1). The engine hanger in Patent Literature 1 includes a pipe penetrating through the frame, and a holder fixed to the engine.

However, in the above-described existing engine supporting structure, since the pipe penetrates through the frame and is exposed to the outside, appearance quality is affected when viewed from a lateral side of a vehicle body.

SUMMARY

Certain embodiments of the present invention have been accomplished in view of the above-mentioned circumstances, and an object of certain embodiments of the present invention is to improve appearance quality of a frame while capable of providing a member for supporting an engine on an inner side of the frame, in an engine supporting structure for a saddle-ride type vehicle.

In order to address the above-mentioned object, according to certain embodiments of the present invention, there is provided an engine supporting structure for a saddle-ride type vehicle in which an engine is supported from above substantially in a center position between a head pipe and a pivot in a side view, on a pair of right and left main frames that are branched to right and left from the head pipe and that extend rearward. Only inner surfaces in a vehicle width direction of the right and left main frames are formed with a pair of left and right mounting portions that project inward in the vehicle width direction. The mounting portions are mounted with brackets that extend downward, and the engine is supported through the brackets.

According to certain embodiments of the present invention, only the inner surfaces in the vehicle width direction of the main frames are provided with the pair of left and right mounting portions that project inward in the vehicle width direction, and the mounting portions for the brackets are not exposed to the vehicle width direction. Therefore, the appearance quality can be improved while capable of providing the brackets on the inner sides of the main frames. Since the brackets can be provided on the inner sides in the vehicle width direction of the right and left main frames, a more compact structure can be achieved in the vehicle width direction, and a riding posture can be improved.

According to other embodiments, the main frames have a vertically long shape in a cross-sectional view. The mounting portions on the inner surfaces are provided to lower portions having a vertically long shape of the main frames, and the inner surfaces above the mounting portions are provided with reinforcing members that reinforce the main frames.

According to certain embodiments of the present invention, a reduction in weight and an improvement in rigidity can be achieved by shortening the brackets in a vertical direction. Since a portion applied with stress above the mounting portions can be reinforced by the reinforcing members, rigidity of the main frames can be secured.

According to other embodiments, the main frames have a shape that is narrowed in the vehicle width direction from substantially the center position toward a side of the pivot. The mounting portions are provided in two positions in a longitudinal direction with respect to the respective main frames. That is, the mounting portions are provided in four positions in total with respect to the right and left main frames, and the mounting portions in the two rear positions are positioned inside of the mounting portions in the two front positions in the vehicle width direction.

According to certain embodiments of the present invention, the engine can be supported by the brackets corresponding to the main frames having the shape that is narrowed in the vehicle width direction toward the side of the pivot.

Further, according to other embodiments, the brackets have a substantially V shape in the side view.

According to certain embodiments of the present invention, volume of the brackets can be reduced, and also rigidity of upper portions of the brackets is moderately reduced to allow deflection.

According to other embodiments, material of each of the main frames is steel, material of each of the brackets is aluminum, and the brackets have a substantially U shape in the cross-sectional view.

According to certain embodiments of the present invention, since the material of each of the brackets is aluminum, the appearance quality is improved. Also, since aluminum has excellent formability, the shape is easily changed to easily adjust the rigidity. Further, since the brackets have the substantially U shape in the cross-sectional view, a lightening effect can be obtained, and the reduction in weight can be achieved.

According to other embodiments, the brackets have inner projecting portions that extend horizontally toward an inner side in the vehicle width direction, and the inner projecting portions support an electrical component case.

According to certain embodiments of the present invention, since it is not necessary to provide an exclusive member for supporting the electrical component case, the number of components is reduced to simplify the structure.

In certain embodiments of the present invention, appearance quality can be improved while providing brackets on inner sides of main frames. Further, a more compact structure can be achieved in a vehicle width direction, and a riding posture can be improved.

A reduction in weight and an improvement in rigidity can be achieved by shortening the brackets in a vertical direction. Further, the rigidity of the main frames can be secured by reinforcing members.

Additionally, an engine can be supported by the brackets corresponding to a shape of each of the main frames.

Further, volume of the brackets can be reduced, and also rigidity of the upper portions of the brackets is moderately reduced to allow deflection.

Since the material of each of the brackets is aluminum, the appearance quality is improved, and also the shape of each of the brackets is easily changed to easily adjust the rigidity. Further, the reduction in weight can be achieved by lightening.

Additionally, since it is not necessary to provide the exclusive member for supporting the electrical component case, the number of components is reduced to simplify the structure.

DETAILED DESCRIPTION

Figure 1:
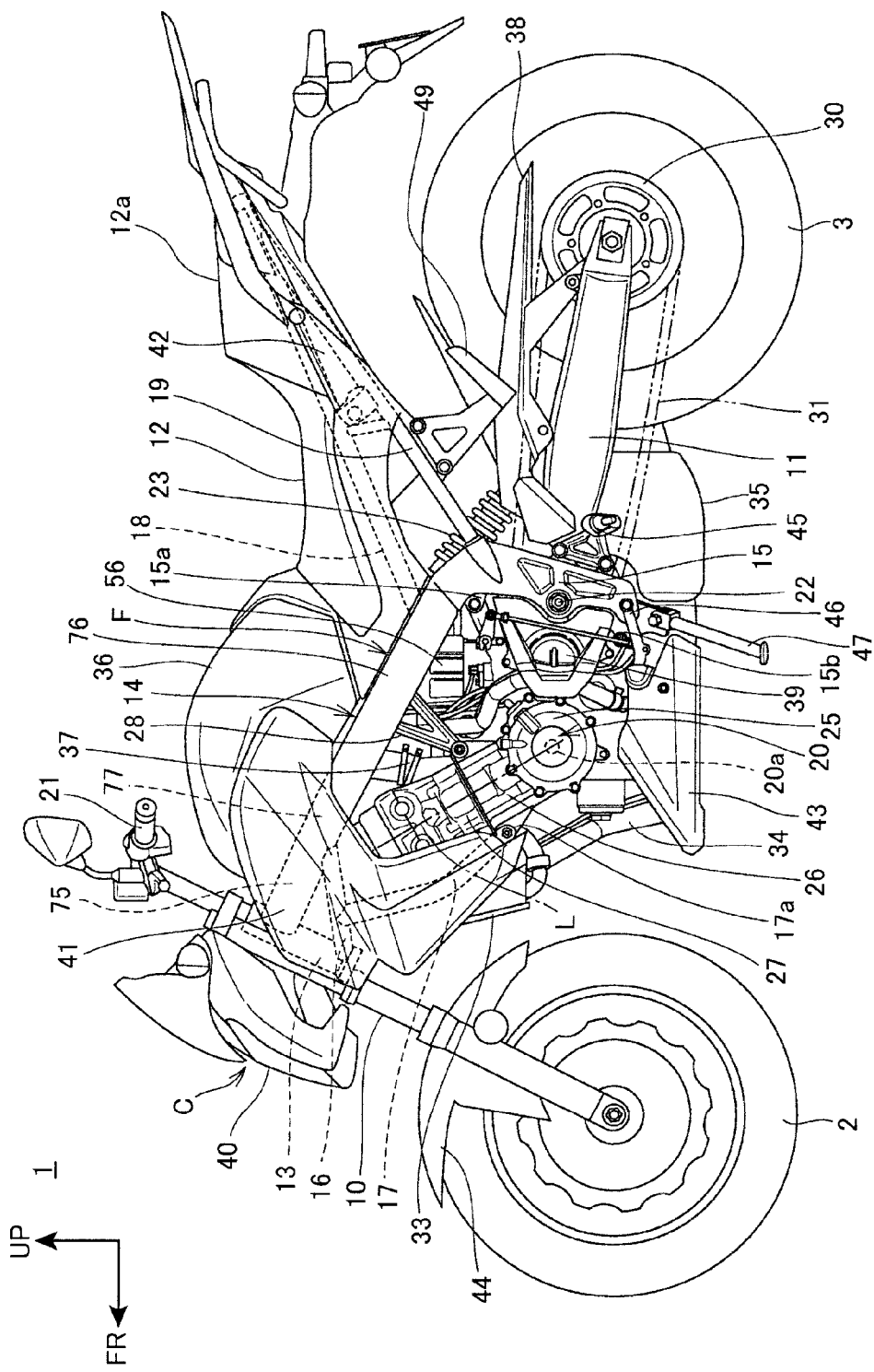
FIG. 1 is a left side view of a motorcycle according to an embodiment of the present invention.

Hereinafter, embodiments of the present invention will be described with reference to the drawings. Note that in the explanation, description of directions such as front and rear, right and left, and upper and lower, is the same direction with respect to a vehicle body unless otherwise stated. Also, in the drawings, a reference sign FR is indicative of a front side of the vehicle body, a reference sign UP is indicative of an upper side of the vehicle body, and a reference sign LE is indicative of a left side of the vehicle body.

FIG. 1 is a left side view of a motorcycle according to certain embodiments of the present invention.

The motorcycle 1 is a vehicle configured such that an engine 20, as a power unit, is supported on a vehicle body frame F, a steerable front fork 10 for supporting a front wheel 2 is supported at a front end of the vehicle body frame F, and a swing arm 11 for supporting a rear wheel 3 is provided on a rear side of the vehicle body frame F. The motorcycle 1 is a saddle-ride type vehicle configured such that a seat 12 on which an occupant is seated in a straddling manner is provided above a longitudinally center portion of the vehicle body frame F. A part of the vehicle body frame F is covered with a resin vehicle body cover C.

Figure 2:
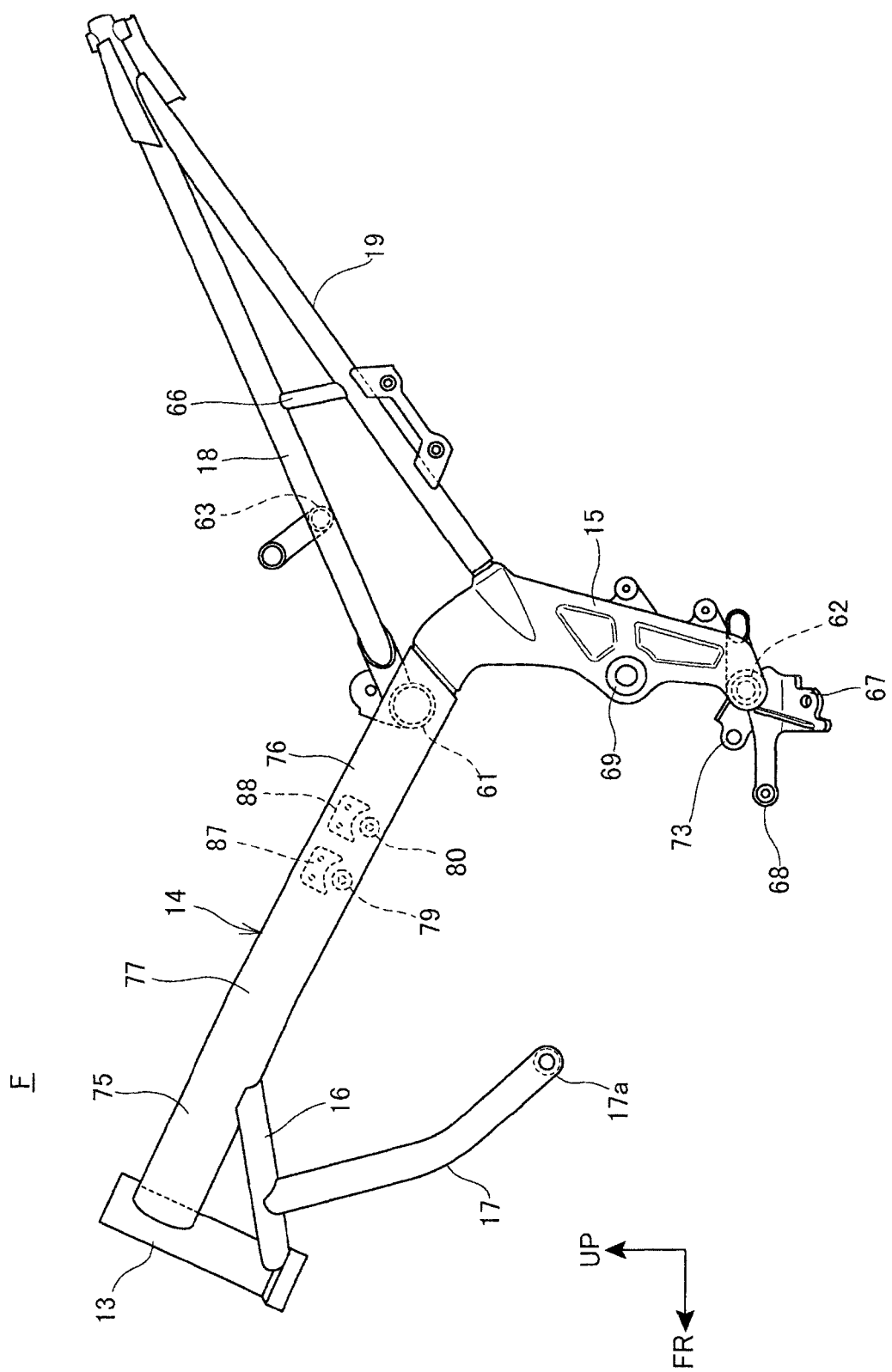
FIG. 2 is a left side view of a vehicle body frame.
Figure 3:
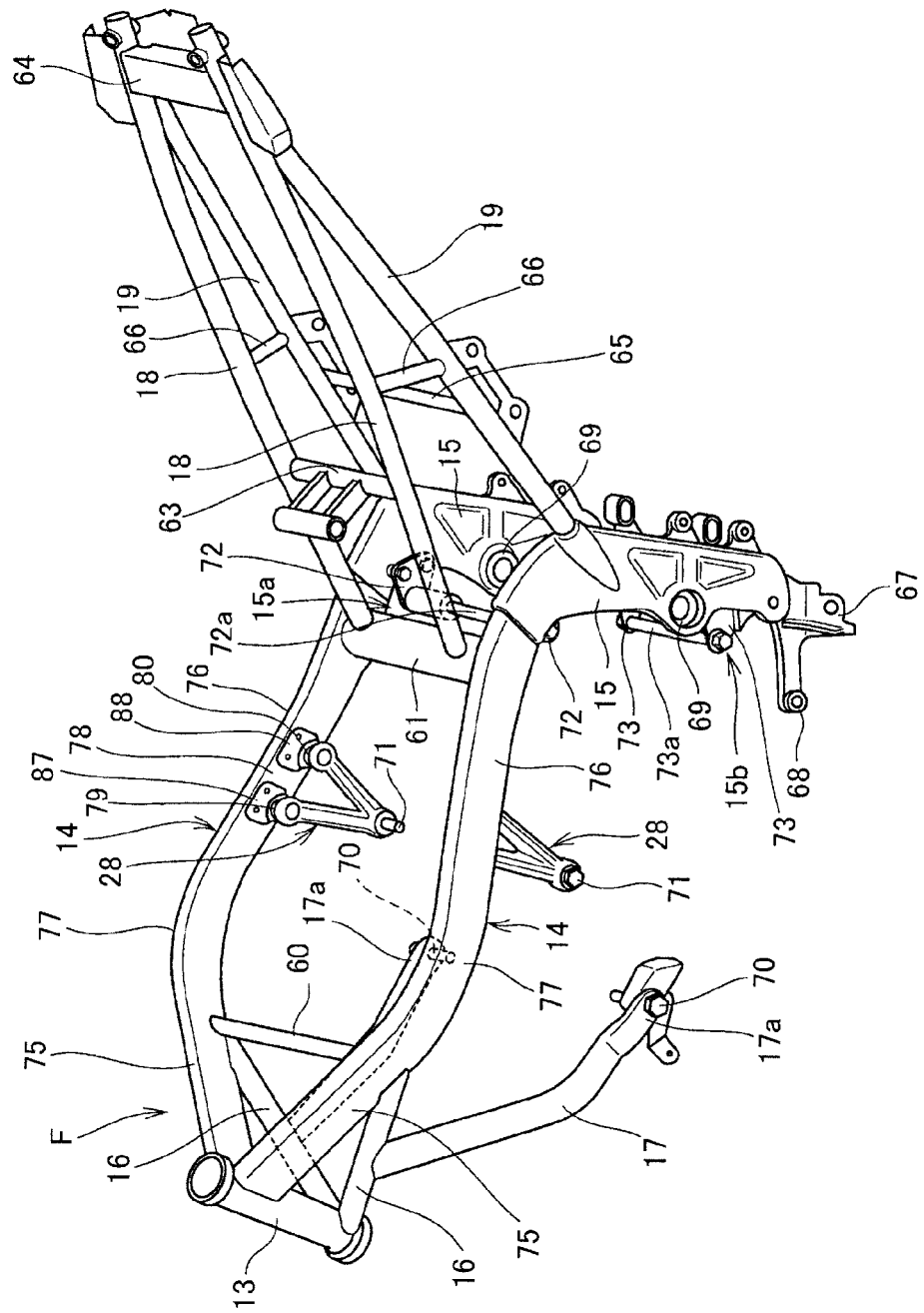
FIG. 3 is a perspective view when the vehicle body frame is viewed from an upper left side.

FIG. 2 is a left side view of the vehicle body frame F. FIG. 3 is a perspective view when the vehicle body frame F is viewed from an upper left side.

The vehicle body frame F includes a head pipe 13 that is provided at a front end. The vehicle body frame F also includes a pair of right and left main frames 14, 14 that incline and extend obliquely downward toward a rear side from the head pipe 13. The vehicle body frame F further includes a pair of right and left center frames 15, 15 that extend downward from rear ends of the main frames 14. The vehicle body frame F also includes a pair of right and left reinforcing frames 16, 16 that connect a lower portion of the head pipe 13 and front portions of the main frames 14. The vehicle body frame F further includes a pair of right and left hanger frames 17, 17 that extend downward from the reinforcing frames 16. Further, the vehicle body frame F includes a pair of right and left seat frames 18, 18 that extend rearward and upward from the rear ends of the main frames 14. The vehicle body frame F also includes a pair of right and left sub-frames 19, 19 that connect upper portions of the center frames 15 and rear ends of the seat frames 18.

The head pipe 13, the main frames 14, 14, the center frames 15, 15, the reinforcing frames 16, 16, the hanger frames 17, 17, the seat frames 18, 18, and the sub-frames 19, 19, are formed of pipe-like or plate-like iron and steel materials. The vehicle body frame F is integrally formed by connecting the respective frames with each other by welding.

As shown in FIG. 3, the vehicle body frame F includes a front cross member 60 that connects the front portions of the main frames 14, 14 to each other in a vehicle width direction, and a rear cross member 61 that connects rear portions of the main frames 14, 14 to each other in the vehicle width direction. Also, the vehicle body frame F includes a lower cross member 62 that connects lower portions of the center frames 15, 15 to each other in the vehicle width direction. Further, the vehicle body frame F includes a seat lower cross member 63 that connects front portions of the seat frames 18, 18 to each other, a rear end cross member 64 that connects rear ends of the seat frames 18, 18 to each other, and a rear lower cross member 65 that connects intermediate portions of the sub-frames 19, 19 to each other. These cross members 60 to 65 are formed of iron and steel materials.

Also, rear reinforcing frames 66, 66 that connect the seat frames 18 and the sub-frames 19 are provided to longitudinally intermediate portions of the seat frames 18, 18.

A lower portion of the center frame 15 on a left side (on one side) is provided with a kickstand stay 67 attached with a side kickstand 47, and a pedal stay 68 attached with a shifting pedal 46.

Vertical intermediate portions of the center frames 15, 15 are formed with pivot holes 69, 69 connected with the swing arm 11.

As shown in FIG. 1, the front fork 10 is rotatably journaled to the head pipe 13 through a steering shaft (not shown), and the front wheel 2 is journaled to the lower portion of the front fork 10. A steering handlebar 21 is fixed to an upper end of the front fork 10.

The swing arm 11 is rotatably journaled by a pivot shaft 22 that extends in the vehicle width direction and that is inserted into the pivot holes 69, 69. The rear wheel 3 is journaled to the rear end of the swing arm 11. One rear suspension 23 is laid between the swing arm 11 and the vehicle body frame F.

Figure 4:
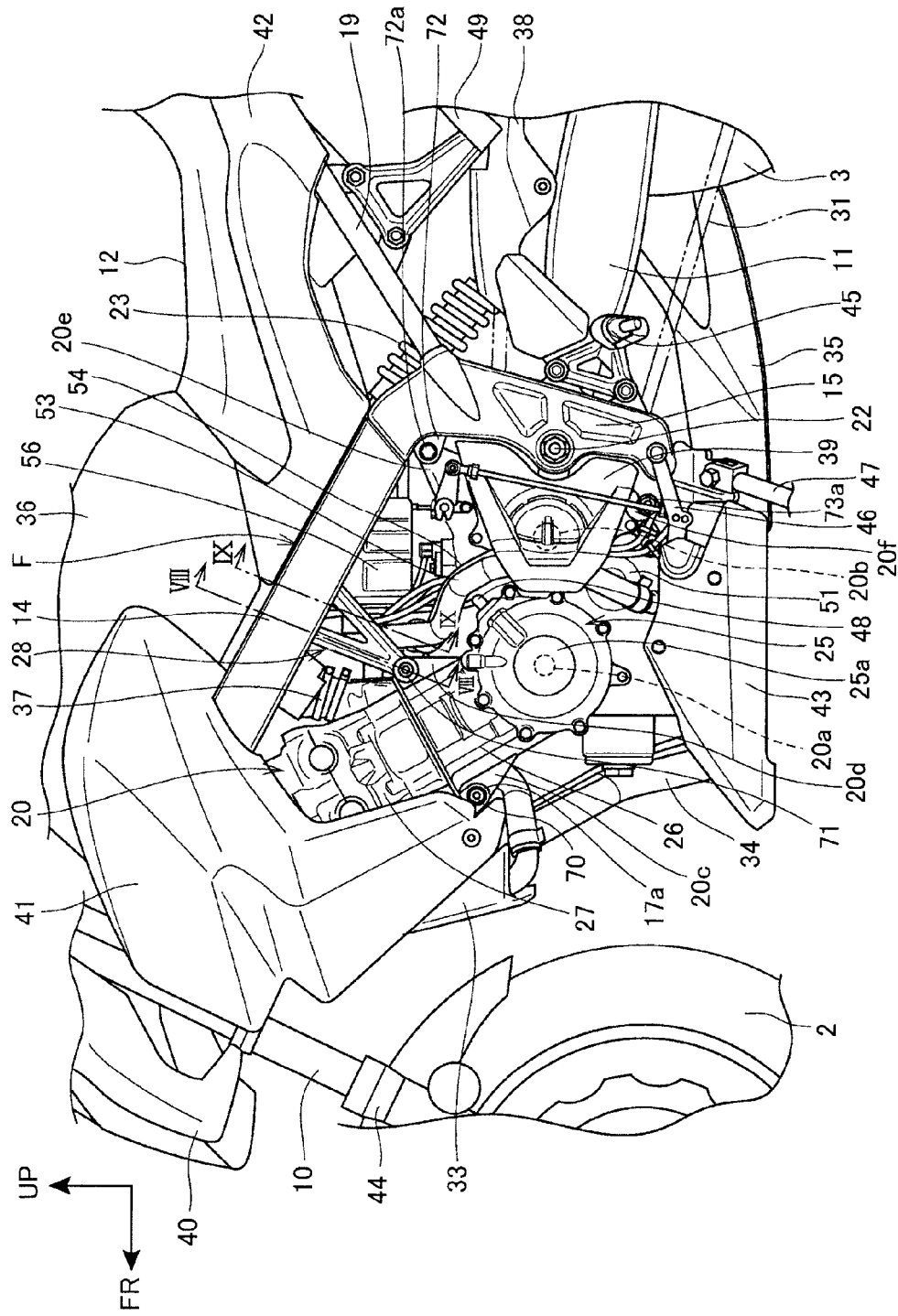
FIG. 4 is a left side view around an engine.

FIG. 4 is a left side view around the engine 20.

The engine 20 is a water-cooled inline four-cylinder four-cycle engine, and a crankshaft 20a is arranged to extend horizontally in the vehicle width direction. The engine 20 includes a crankcase 25, a cylinder 26 that is provided on an upper surface of a front portion of the crankcase 25, and a cylinder head 27 that is connected to an upper surface of the cylinder 26. A cylinder shaft L (FIG. 1) thereof is arranged to be forwardly inclined.

An output shaft 20b of a transmission incorporated in the crankcase 25 projects outward from a left surface of a rear portion of the crankcase 25. The output shaft 20b extends in parallel with the crankshaft 20a. Output from the engine 20 is transmitted to the rear wheel 3 through a drive sprocket (not shown) provided to the output shaft 20b, a driven sprocket 30 provided to the rear wheel 3, and a chain 31 wound around the drive sprocket and the driven sprocket 30. The drive sprocket is covered with a lateral cover 39 fixed to the crankcase 25. An upper portion of the chain 31 is covered from above with a chain cover 38 provided to the swing arm 11.

A plate-like radiator 33 for circulation of cooling water for the engine 20 is disposed in front of the cylinder 26 and the cylinder head 27.

Four exhaust pipes 34 connected to respective cylinders below the cylinder head 27 are downwardly brought out of the front surface of the cylinder head 27, collected into one below the crankcase 25, and connected to a muffler 35 disposed below the right (other) center frame 15.

A fuel tank 36 is disposed above the main frames 14, 14. The seat 12 is formed in continuity to the rear portions of the main frames 14, 14, and supported on the seat frames 18, 18.

An intake device 37 including a throttle body connected to the cylinder head 27 and a fuel injection device (not shown) for supplying fuel into an intake passage are disposed between the rear surface of the cylinder head 27 and a lower surface of the fuel tank 36.

The left surface of the front portion of the crankcase 25 is formed with a generator storage portion 25a cylindrically swelling toward the outside in the vehicle width direction in comparison with the cylinder 26. A generator (not shown) fixed to one end of the crankshaft 20a is provided in the generator storage portion 25a. A wiring 48 of the generator is brought out of an upper portion of a curved rear surface of the generator storage portion 25a. The wiring 48 is curved along an inner side in the vehicle width direction, and extends to a side of the rear surface of the cylinder head 27.

A left rear side surface of the crankcase 25 behind the generator storage portion 25a is provided with the output shaft 20b. The output shaft 20b is arranged behind the crankshaft 20a at substantially the same height as the crankshaft 20a.

In the vicinity of the rear side surface of the crankcase 25, a pump section 51 for circulating the cooling water for the engine 20 is disposed at a position between the crankshaft 20a and the output shaft 20b and below the output shaft 20b. The pump section 51 has, on the inner side of the crankcase 25, a pump shaft driven by power of the crankshaft 20a and a rotor (not shown) provided on the pump shaft.

The pump section 51 is connected with a delivery hose 53 connected to the cylinder 26 and a suction hose 54 connected to a rear surface of the cylinder head 27. The cooling water after led to flow into in the cylinder head 27, the radiator 33 and the cylinder 26 through the delivery hose 53 is returned to the pump section 51 through the suction hose 54, and circulated in the engine 20.

Above the rear portion of the crankcase 25, a brake unit storage portion 56 is disposed behind the delivery hose 53 and the suction hose 54 and between the main frames 14, 14.

As shown in FIG. 1, the vehicle body cover C includes a front cover 40 that covers the head pipe 13 from the front side, a pair of right and left front side covers 41 that cover the front portion of the vehicle body frame F and the front portion of the fuel tank 36 from a lateral side, and a rear cover 42 that covers the seat frame 18 from the lateral side. Also, the vehicle body cover C includes an undercover 43 that covers the front portion of the crankcase 25 from below. The front fork 10 is provided with a front fender 44.

The rear portions of the lower portions of the center frames 15 are provided with a pair of right and left steps 45 on which an occupant seated on the seat 12 places his/her feet. The shifting pedal 46 for performing shift operation by the occupant is provided in front of the left step 45. Also, the side kickstand 47 is fixed to the lower portion of the left center frame 15.

Tandem steps 49 for placing feet of a pillion passenger seated on a rear portion 12a (FIG. 1) of the seat 12 is fixed to the sub-frames 19, 19.

As shown in FIGS. 3 and 4, the engine 20 is fixed through front hanger portions 17a, 17a that are provided at lower ends of the hanger frames 17, 17, a pair of right and left engine hangers 28, 28 that are provided to longitudinally intermediate portions of the main frames 14, 14, and rear fixing portions 15a, 15b that are provided to upper portions and lower portion of front edges of the center frames 15, 15. In the side view, the engine 20 is positioned substantially in the center in the longitudinal direction between the head pipe 13 and the pivot shaft 22, and fixed so as to be suspended from the vehicle body frame F.

The engine 20 includes fixing portions 20c, 20c that are fastened to the front hanger portions 17a, 17a and that are provided on the front surface of the cylinder 26, and fixing portions 20d, 20d that are fastened to the engine hangers 28, 28 and that are provided on the rear surface of the cylinder 26. Also, the engine 20 includes fixing portions 20e, 20f that are fastened to the rear fixing portions 15a, 15b and that are provided to the upper portion and the lower portion of the rear end of the crankcase 25.

In the front hanger portions 17a, 17a, the fixing portions 20c, 20c of the engine 20 are fastened by a pair of bolts 70, 70 that are inserted into the front hanger portions 17a, 17a from the outside in the vehicle width direction.

In the engine hangers 28, 28, the fixing portions 20d, 20d of the engine 20 are fastened by a pair of bolts 71, 71 that are inserted into the lower ends of the engine hangers 28, 28 from the outside in the vehicle width direction.

The rear fixing portion 15a is provided with a pair of plates 72, 72 (FIG. 3) that are fastened and fixed to the inner surfaces of the upper portions of the main frames 14, 14 and that extend forward, and a bolt 72a that is inserted between the plates 72, 72. In the rear fixing portion 15a, the engine 20 is supported by one bolt 72a that is stretched between the plates 72, 72 and that penetrates through the fixing portion 20e.

The rear fixing portion 15b is provided with a pair of stays 73, 73 that are welded and fixed to the inner surfaces of the lower portions of the main frames 14, 14 and that extend forward, and a bolt 73a that is inserted between the stays 73, 73. In the rear fixing portion 15b, the engine 20 is supported by one bolt 73a that is stretched between the stays 73, 73 and that penetrates through the fixing portion 20f.

The hanger frames 17, 17, the plates 72, 72, and the stays 73, 73 are made of iron and steel materials. The engine hangers 28, 28 are formed of aluminum alloy.

Figure 5:
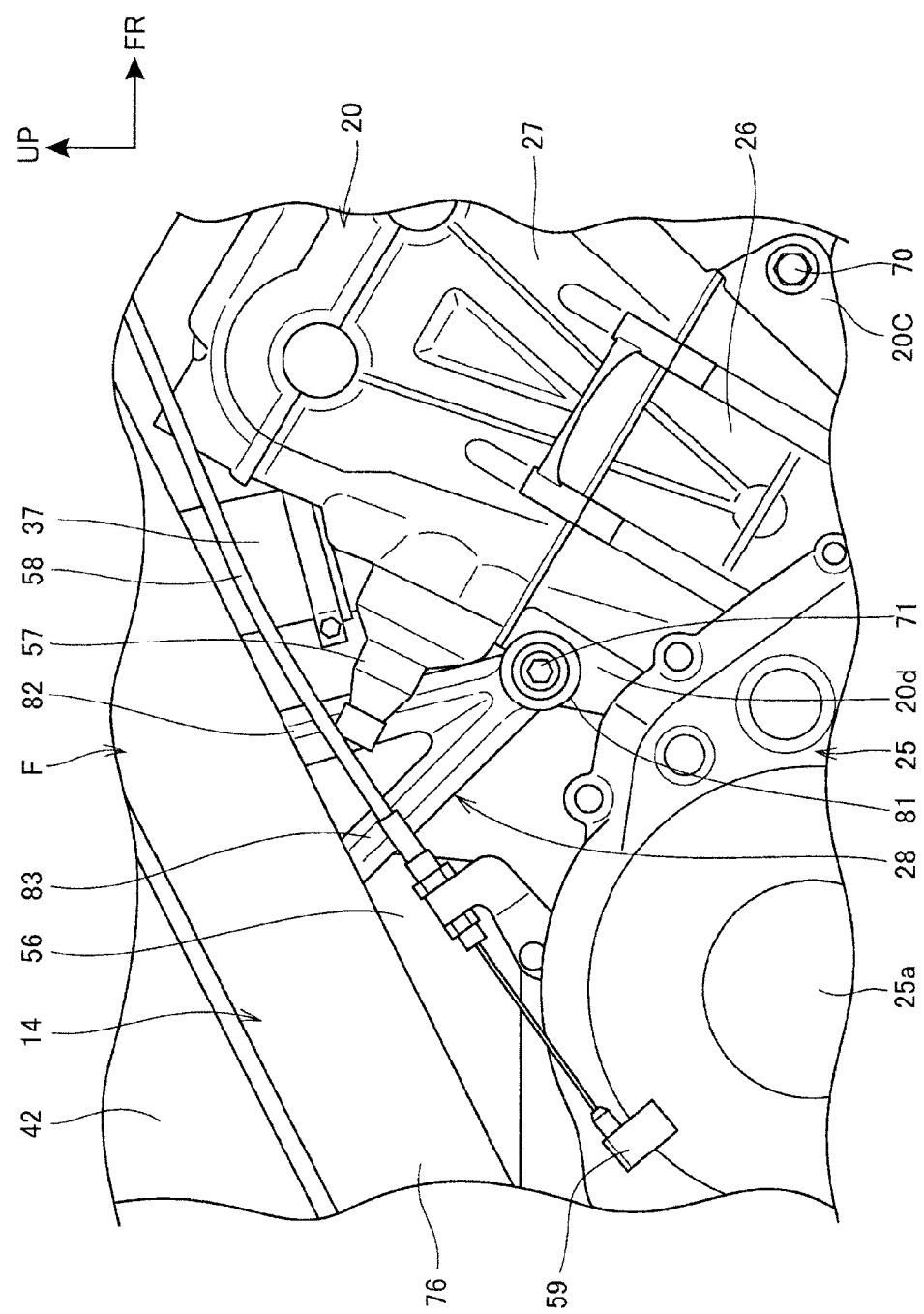
FIG. 5 is a right side view in the vicinity of the engine.

FIG. 5 is a right side view in the vicinity of the engine 20.

As shown in FIG. 5, the right end of the rear surface of the cylinder head 27 is mounted with a sensor 57 for detecting oil temperature of the engine 20. The sensor 57 projects rearward, and has a tip end positioned outward of the right engine hanger 28.

A cable 58 extending from a clutch operating lever (not shown) of the handlebar 21 extends rearward so as to be arranged along the lower surface of the right main frame 14, is passed through an outer side of the right engine hanger 28, and is connected to a cable connection 59 on the right surface of the rear portion of the crankcase 25.

As shown in FIGS. 2 and 3, the main frames 14, 14 include frame front portions 75, 75 that are branched to right and left from the rear portion of the head pipe 13 and that are configured such that an interval between the main frames 14, 14 is widened in the vehicle width direction toward the rear side. Also, the main frames 14, 14 include frame rear portions 76, 76 configured such that the interval between the main frames 14, 14 is narrowed in the vehicle width direction from the frame front portions 75, 75 toward a side of the pivot shaft 22 positioned on the rear side, and the center frames 15 are connected to the rear ends of the frame rear portions 76, 76. Further, the main frames 14, 14 include, at a boundary between the frame front portions 75, 75 and the frame rear portions 76, 76, greatest width portions 77, 77 with a width in the vehicle width direction reaching greatest width. The greatest width portions 77, 77 are positioned above the rear portion of the cylinder head 27.

The reinforcing frames 16, 16 extend slightly upward to the rear from the lower portion of the rear portion of the head pipe 13, and is connected to the lower surfaces of the main frames 14, 14 at a position forward of the greatest width portions 77, 77. The front cross member 60 is arranged at a position in the vicinity of the rear ends of the reinforcing frames 16, 16 and forward of the greatest width portions 77, 77.

The rear cross member 61 is provided at the rear ends of the frame rear portions 76, 76, and the front ends of the seat frames 18, 18 are connected to the rear cross member 61.

The inner surfaces 78, 78 of the frame rear portions 76, 76 in the vehicle width direction are respectively provided with front mounting portions 79, 79 and rear mounting portions 80, 80 to which the engine hangers 28, 28 are attached.

Figure 6:
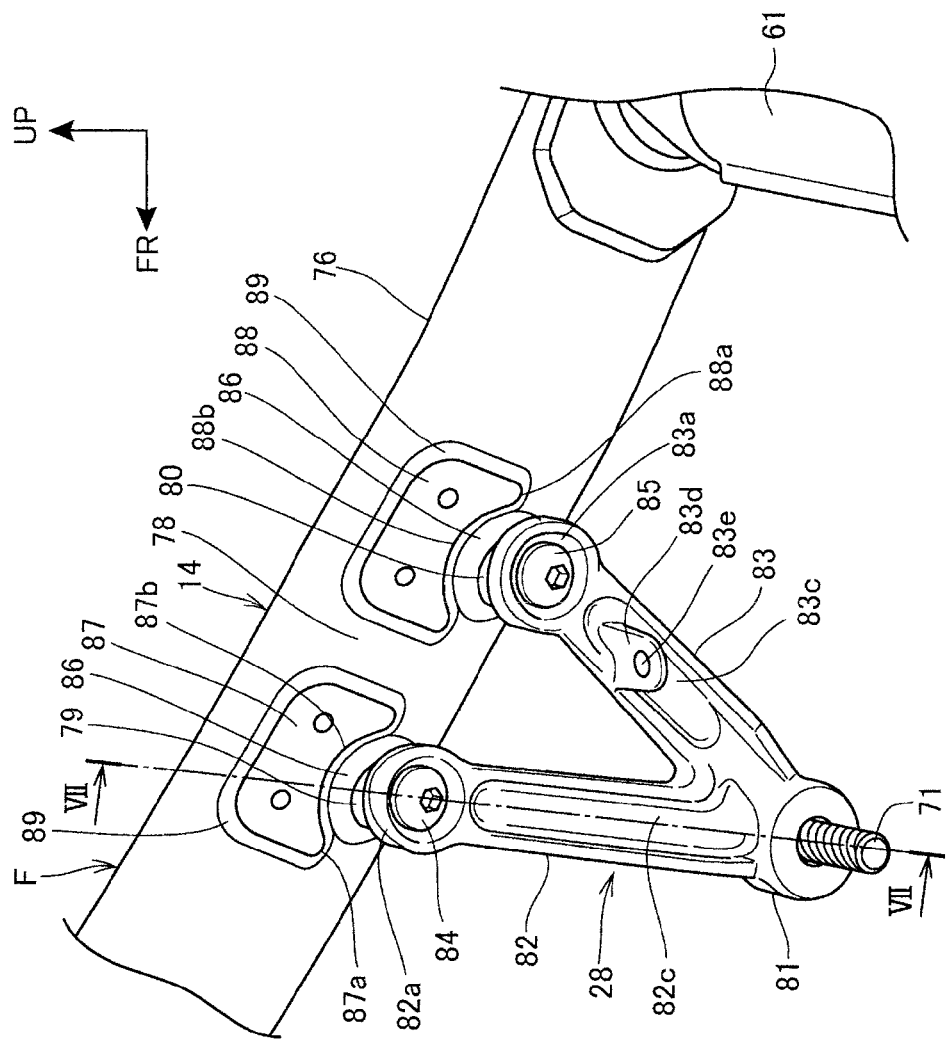
FIG. 6 is a view with a right engine hanger mounted.
Figure 7:
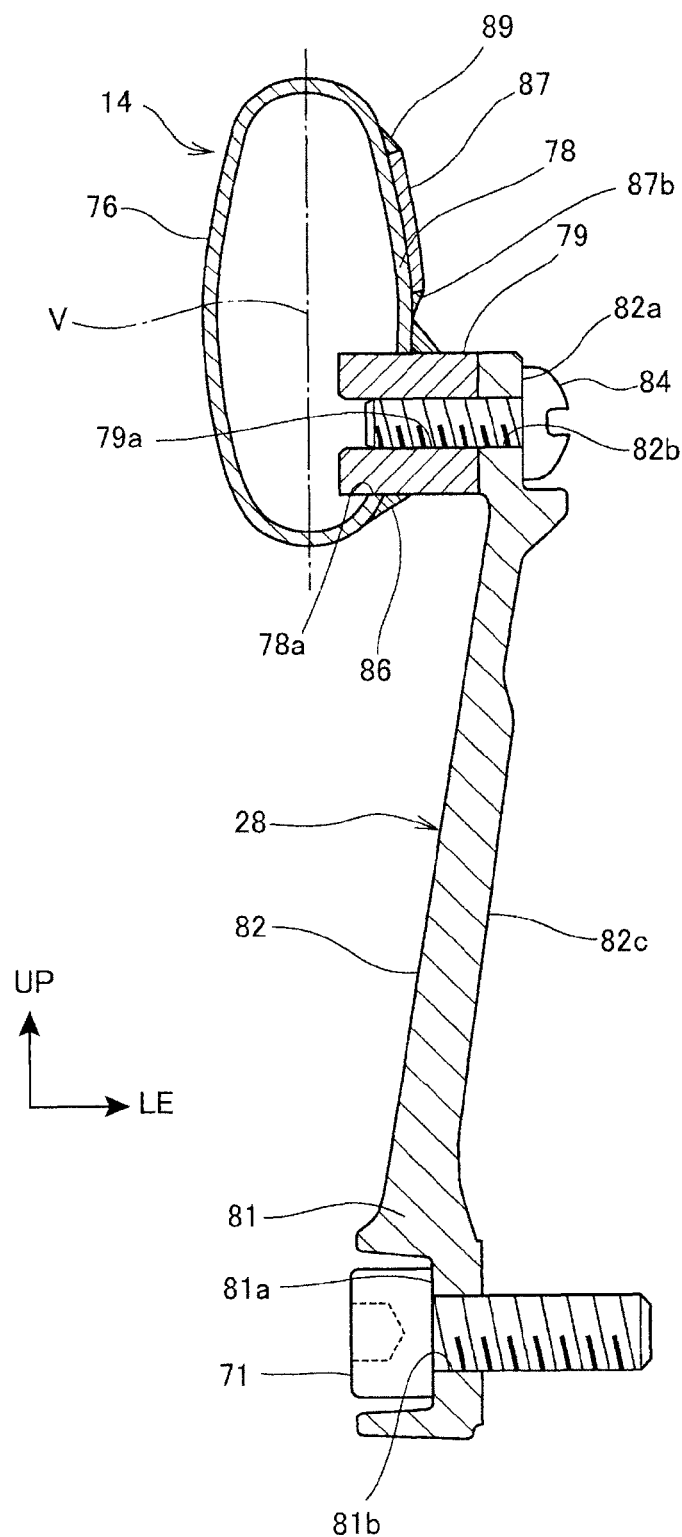
FIG. 7 is a cross-sectional view taken along VII-VII in FIG. 6.

FIG. 6 is a view with the right engine hanger 28 mounted. FIG. 7 is a cross-sectional view taken along VII-VII in FIG. 6. In the embodiment, the engine hangers 28, 28 and the mounting structure for the same are substantially symmetrically configured. Here, the right engine hanger 28 will be mainly described.

Each of the engine hangers 28 has a cylindrical engine connection 81 fixed to the fixing portion 20*d* of the engine 20, and a front arm portion 82 and a rear arm portion 83 that respectively extend upward in a manner as to form a rod-like shape with the engine connection 81 as a base. The rear arm portion 83 is arranged in a posture of inclining rearward in comparison with the front arm portion 82. An interval between the front arm portion 82 and the rear arm portion 83 is increased toward the upper end. That is, in the side view, the engine hanger 28 is formed in the substantially V shape with the engine connection 81 as a starting point.

In the side view, the engine hanger 28 is arranged with the front arm portion 82 arranged in a posture of inclining rearward in comparison with a vertical line, and supports the engine 20 so that the engine 20 is obliquely suspended toward a front lower side.

An outer surface of the engine connection 81 is formed with a seat portion 81*a* that is recessed inward to receive a head of a bolt 71, and the seat portion 81*a* is formed with a hole 81*b* into which the bolt 71 is inserted.

The engine hanger 28 is fixed to the front mounting portion and the rear mounting portion 80 by inner bolts 84, 85 respectively provide at upper ends of the front arm portion 82 and the rear arm portion 83.

An inner surface in the vehicle width direction of the upper end of the front arm portion 82 is provided with a seat portion 82*a* for receiving a head of the inner bolt 84, and the seat portion 82*a* is formed with a hole 82*b* into which the inner bolt 84 is inserted.

An inner surface in the vehicle width direction of the upper end of the rear arm portion 83 is provided with a seat portion 83*a* for receiving a head of the inner bolt 85, and the seat portion 83*a* is formed with a hole (not shown) into which the inner bolt 85 is inserted.

The inner surface of the front arm portion 82 is formed with a groove 82*c* that extends between the engine connection 81 and the seat portion 82*a*, and the front arm portion 82 is lightened by the groove 82*c*.

The inner surface of the rear arm portion 83 is formed with a groove 83*c* that extends between the engine connection 81 and the seat portion 83*a*, and the rear arm portion 83 is lightened by the groove 83*c*.

Since the front arm portion 82 and the rear arm portion 83 are formed with the grooves 82*c*, 83*c*, in the cross-sectional view, the front arm portion 82 and the rear arm portion 83 are formed to have the substantially U shape, and are configured to achieve the reduction in weight.

On the inner surface of the rear arm portion 83, a plate-like electrical component stay 83*d* projecting substantially horizontally toward the inner side in the vehicle width direction is formed below the seat portion 83*a*. The electrical component stay 83*d* is formed with a fitting hole 83*e* vertically penetrated therethrough.

The engine hanger 28 is formed of aluminum alloy, and the whole thereof is integrally formed by molding.

As shown in FIG. 7, the main frame 14 is a pipe member having a cross-sectional surface formed into a substantially elliptical shape in a vertical direction, and the inside of the main frame 14 is hollowed. Fixing holes 78*a* penetrating through the inner surface 78 are respectively formed in the portions of the inner surface 78 of the main frame 14 with the front mounting portion 79 and the rear mounting portion 80 provided. Each of the fixing holes 78*a* is formed in the lower portion of the cross-sectional shape of the substantially elliptical shape of the frame rear portion 76.

The front mounting portion 79 is formed into a cylindrical shape, and is provided in the center thereof a female screw portion 79*a* to which the inner bolt 84 is fastened. The rear mounting portion 80 is formed into a cylindrical shape, and is provided in the center thereof a female screw portion (not shown) to which the inner bolt 85 is fastened.

Half of the whole length of each of the front mounting portion 79 and the rear mounting portion 80 are substantially fitted into the fixing hole 78*a* to a depth entering the inside of the main frame 14, and is fixed to the main frame 14 by a welding bead 86 formed on the whole circumference of the periphery of each fixing hole 78*a*. That is, the front mounting portion 79 and the rear mounting portion 80 are provided in the lower portion of the inner surface 78, project inward in the vehicle width direction, and are not exposed to the side of the outer surface of the main frame 14 in the vehicle width direction.

The upper portion of the inner surface 78 above the front mounting portion 79 and the rear mounting portion 80 is provided with reinforcing plates 87, 88 respectively for reinforcing the inner surface 78. The reinforcing plates 87, 88 are formed to have a substantially rectangular shape long not in the vertical direction but in an extending direction of the main frame 14, and also have larger diameters than those of the front mounting portion 79 and the rear mounting portion 80 in the extending direction. Also, thickness of the reinforcing plates 87, 88 is formed to be substantially the same as or to be thicker than the thickness of the main frame 14 to which the reinforcing plates 87, 88 are attached. Materials of the reinforcing plates 87, 88 are iron and steel.

The reinforcing plates 87, 88 extend to a lower portion of the inner surface 78 so that the lower edges 87*a*, 88*a* of the reinforcing plates 87, 88 overlap with the positions of the upper portions of the front mounting portion 79 and the rear mounting portion 80. The longitudinal centers of the lower edges 87*a*, 88*a* are formed with arcuate relief portions 87*b*, 88*b* avoiding the upper portions of the front mounting portion 79 and the rear mounting portion 80.

The reinforcing plates 87, 88 are fixed to the inner surface 78 by weld beads 89 formed around the whole circumference of the peripheries of the reinforcing plates 87, 88.

Figure 8:
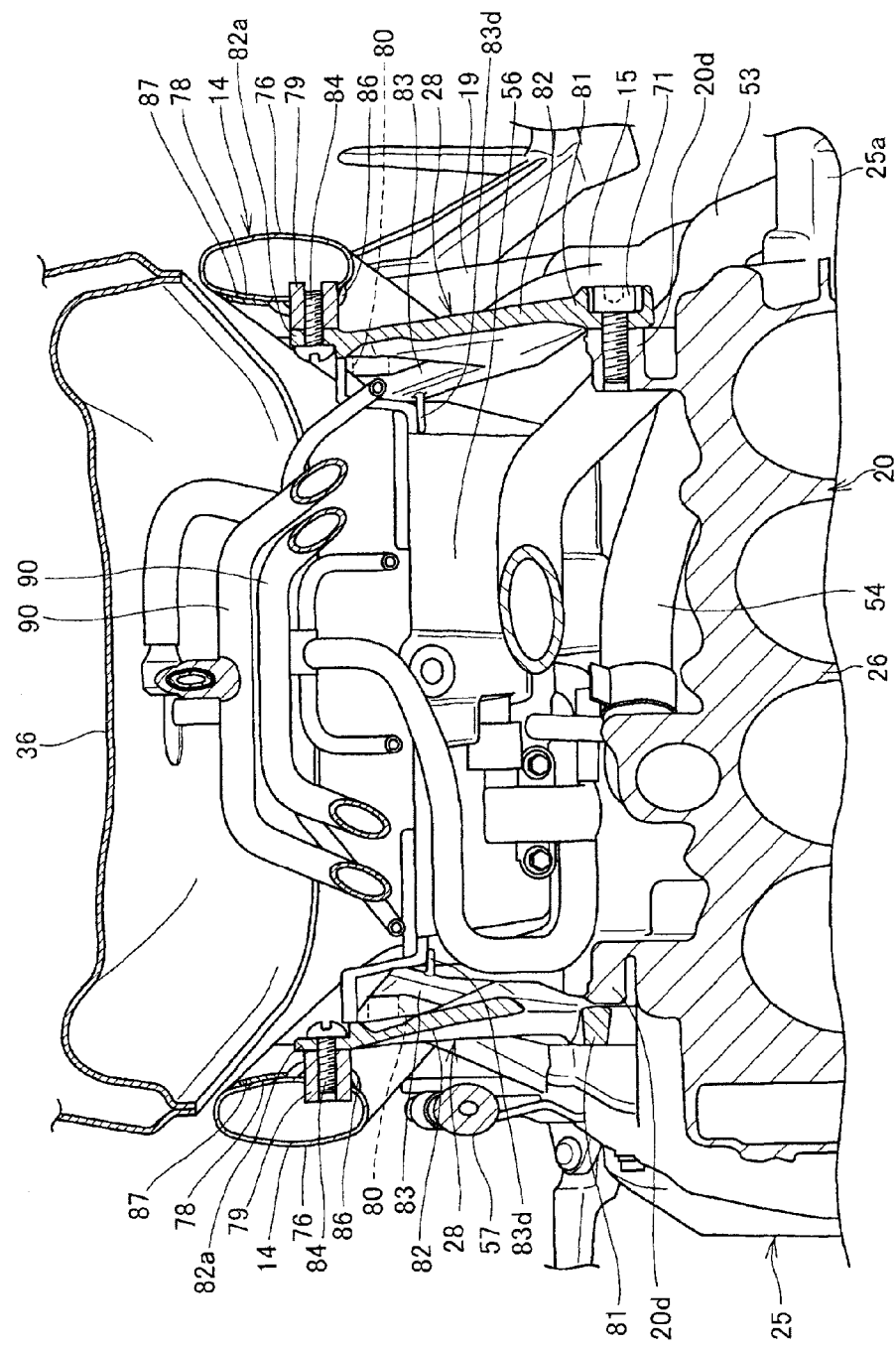
FIG. 8 is a cross-sectional view taken along VIII-VIII in FIG. 4.

FIG. 8 is a cross-sectional view taken along VIII-VIII in FIG. 4.

With reference to FIGS. 7 and 8, the front arm portion 82 is fixed by the inner bolt 84 to the inner end surfaces of the front mounting portions 79, 79 projecting from the inner surfaces 78, 78, and is arranged in a posture of slightly inclining so that the side of the engine connection 81 located on the lower side is positioned outside in the vehicle width direction. The lower sides of the engine hangers 28, 28 are positioned outward in the vehicle width direction. The outside surfaces of the engine connections 81 at the lower ends are positioned inward in the vehicle width direction of the centerline V (FIG. 7) in a width direction of the main frames 14 with the front mounting portions 79, 79 provided. That is, the engine hangers 28, 28 are positioned inside of the main frames 14, 14 in the vehicle width direction, and do not bulge outside from the main frames 14, 14.

In the embodiment, the front mounting portions 79, 79 and the rear mounting portions 80, 80 are provided to only the inner surfaces 78 of the main frames 14, 14, and the front mounting portions 79, 79 and the rear mounting portions 80, 80 are not exposed to the sides of the outer surfaces of the main frames 14, 14. Thereby, excellent appearance quality is achieved. Further, the engine hangers 28, 28 extend downward from the inner sides of the main frames 14, 14, and do not bulge from the main frames 14, 14 toward the outside. Thereby, the engine hangers 28, 28 do not cause an obstruction with respect to the feet of the occupant. For this reason, the degree of freedom in a riding posture of the occupant can be improved.

Also, the front mounting portions 79, 79 and the rear mounting portions 80, 80 are formed into a cylindrical shape extending in the vehicle width direction, and the lengths of the female screw portions 79a to which the inner bolts 84, 85 are fastened are made longer. Thereby, the engine hangers 28, 28 can be firmly fixed.

Also, since the front mounting portions 79, 79 and the rear mounting portions 80, 80 are provided in the lower portions of the inner surfaces 78, a distance between the front mounting portions 79, 79 and the rear mounting portions 80, 80, and the engine 20, gets close, and the engine hangers 28, 28 can be shortened in the vertical direction. For this reason, the rigidity of the engine hangers 28, 28 can be improved. The engine hangers 28, 28 have the V shape, and the front arm portion 82 is not connected to the rear arm portion 83. Thereby, the rigidity can be moderately reduced, and the engine hangers 28, 28 can be moderately deflected.

Since the engine hangers 28, 28 support the engine 20 in a suspended manner, vertically high stress is applied to the front mounting portions 79, 79 and the rear mounting portions 80, 80. In certain embodiments, since the upper portions of the inner surfaces 78, 78 above the front mounting portions 79, 79 and the rear mounting portions 80, 80 are reinforced by the reinforcing plates 87, 88, the rigidity and strength corresponding to the vertically high stress can be sufficiently secured.

The engine hangers 28, 28 support the engine 20, and simultaneously function as members for increasing the rigidity of the main frames 14, 14 by using the rigidity of the engine 20. In certain embodiments, the engine hangers 28, 28 are provided in positions where the amount of deflection of the main frames 14, 14 is likely to be increased due to a load during traveling at the intermediate portions in the longitudinal direction of the main frames 14, 14. For this reason, the amount of deflection of the intermediate portions of the main frames 14, 14 can be effectively reduced by the increase in the rigidity by the engine hangers 28, 28, and rigidity balance of the vehicle body frame F can be improved. The engine hangers 28, 28 are formed of aluminum alloy excellent in formability. Therefore, during layout, trial production or the like, the engine hangers 28, 28 are easily variously deformed, and the rigidity balance of the vehicle body frame F is easily adjusted.

The main frames 14, 14 are configured such that an interval in the vehicle width direction is narrowed toward the pivot shaft 22 located on the rear side (FIG. 1). Therefore, as shown in FIG. 8, the rear mounting portions 80, 80 on the inner surfaces 78 are positioned inward in the vehicle width direction of the front mounting portions 79, 79, corresponding to the shapes of the main frames 14, 14. Also, the main frames 14, 14 are frames arranged rearward and downward, and the rear mounting portions 80, 80 are positioned on lower sides than the front mounting portions 79, 79.

The rear arm portions 83, 83 are formed to be positioned inward in the vehicle width direction toward the seat portions 83a at the upper ends, corresponding to the positions of the rear mounting portions 80, 80, and the seat portions 83a are positioned inward in the vehicle width direction of the seat portions 82a of the front arm portions 82.

Below the fuel tank 36, a fuel supply hose 90 for supplying fuel to a fuel injection device (not shown) for each of cylinders of the engine 20 is arranged between the cylinder 26 and the brake unit storage portion 56.

Figure 9:
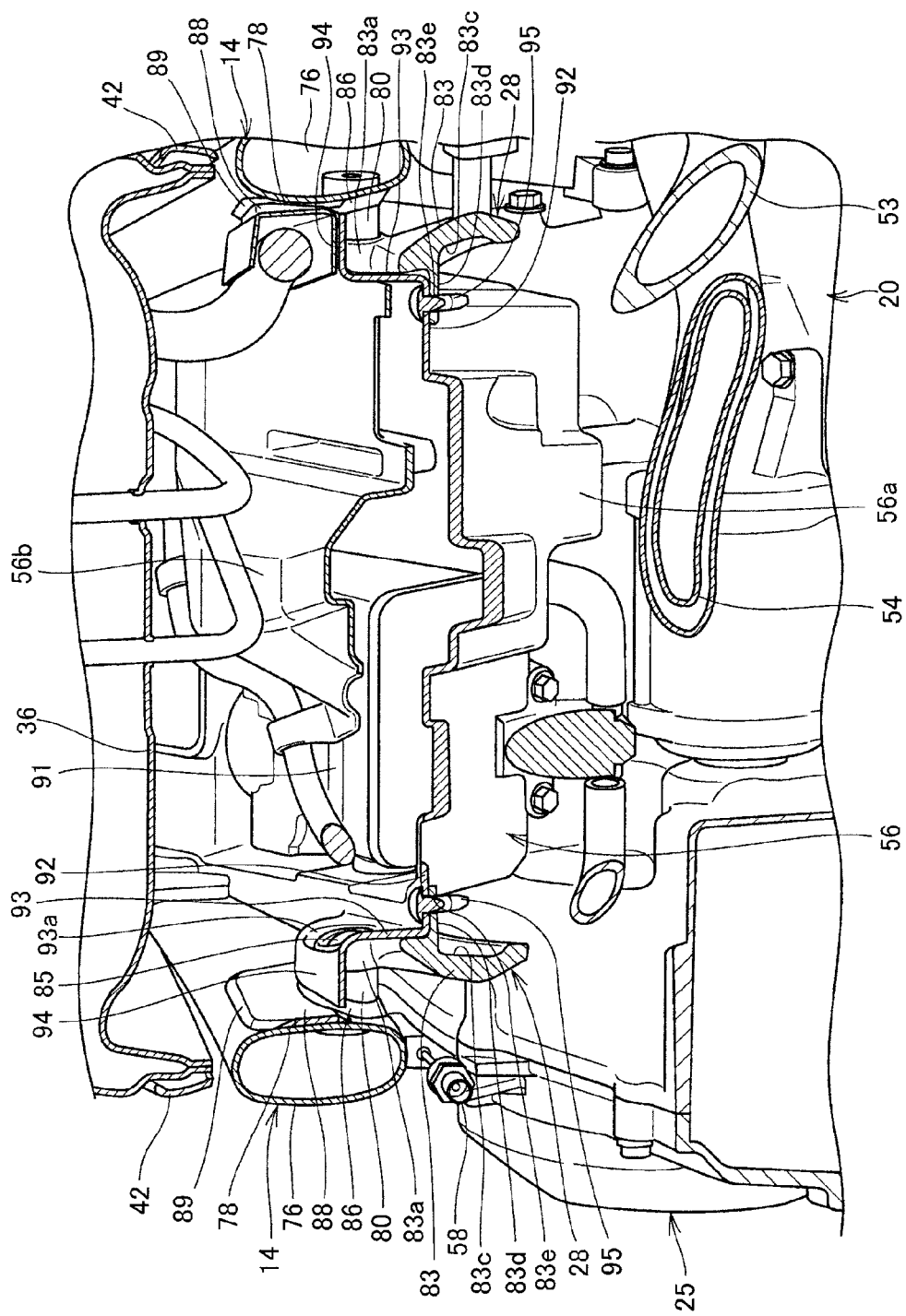
FIG. 9 is a cross-sectional view taken along IX-IX in FIG. 4.
Figure 10:
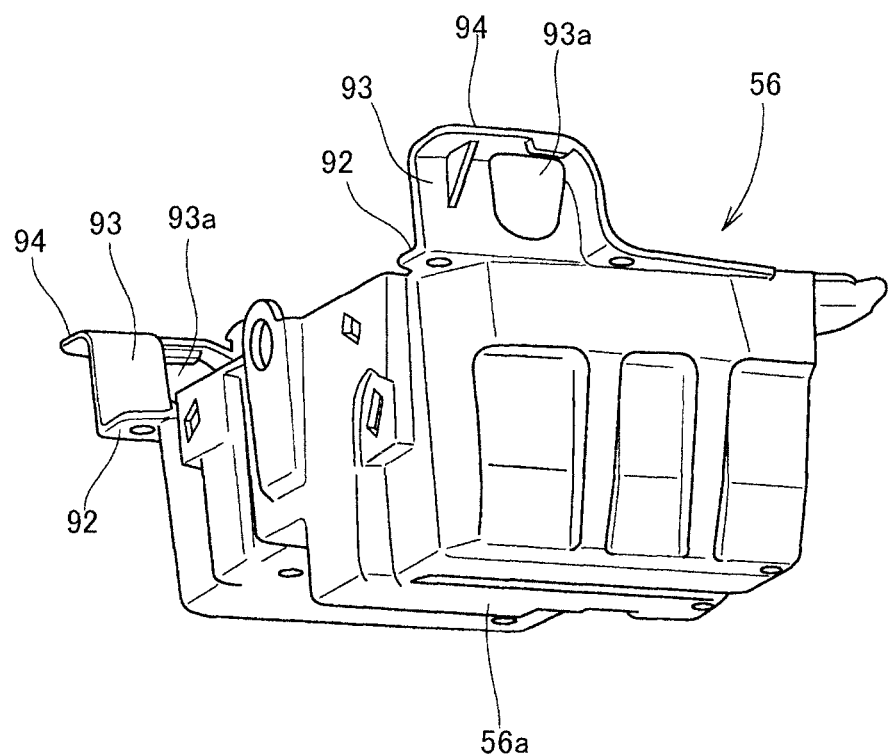
FIG. 10 is a perspective view of a brake unit storage portion.

FIG. 9 is a cross-sectional view taken along IX-IX in FIG. 4. FIG. 10 is a perspective view of the brake unit storage portion 56.

With reference to FIGS. 9 and 10, the brake unit storage portion 56 is arranged between the right and left frame rear portions 76, 76, and the front portion of the brake unit storage portion 56 is supported by the engine hangers 28, 28.

The brake unit storage portion 56 includes a box-shaped main body portion 56a having an opened upper surface and a portion 56b for covering a part of an opening. An ABS unit 91 as an electrical component for controlling hydraulic pressure in a brake device of the motorcycle 1 is stored inside of the brake unit storage portion 56.

The main body portion 56a includes a pair of flange portions 92, 92 that extend outward in the vehicle width direction from the upper edge of the front portion of the main body portion 56a. A wall portion 93 extends upward from an outer edge of each of the flange portions 92. Further, an upper flange portion 94 extends outward in the vehicle width direction from the upper edge of the wall portion 93. The wall portion 93 is formed with an opening 93a penetrating through the wall portion 93.

The brake unit storage portion 56 is supported in such a manner that the flange portions 92, 92 are placed on the electrical component stays 83d, 83d of the engine hangers 28, 28. Also, the brake unit storage portion 56 is fixed to the electrical component stays 83d, 83d by pin-like fixtures 95, 95 that are inserted from above into the flange portions 92, 92 and that are fitted into the fitting holes 83e. Further, the brake unit storage portion 56 is supported in such a manner that the upper flange portions 94, 94 abut from above on the rear mounting portions 80, 80 and the seat portions 83a, 83a. The head of the inner bolt 85 is exposed to the inside of the main body portion 56a through the opening 93a.

In this way, since the brake unit storage portion 56 is fixed by using the engine hangers 28, 28, the brake unit storage portion 56 can be fixed by a simple structure.

As has been described above, according to certain embodiments of the present invention, only the inner surfaces 78, 78 in the vehicle width direction of the right and left main frames 14, 14 that are branched to right and left from the head pipe 13 and that extend rearward are provided with the pair of left front mounting portions 79, 79 and the pair of right rear mounting portions 80, 80, that respectively project inward in the vehicle width direction, the front mounting portions 79, 79 and the rear mounting portions 80, 80 are mounted with the engine hangers 28, 28 that extend downward, and the engine 20 is supported through the engine hangers 28, 28. With this arrangement, since the front mounting portions 79, 79 and the rear mounting portions 80, 80 of the engine hangers 28, 28 are not exposed to the vehicle width direction, the appearance quality can be improved while capable of providing the engine hangers 28, 28 on the inner sides of the main frames 14, 14. Also, since the engine hangers 28, 28 can be provided inside in the vehicle width direction of the right and left main frames 14, 14, a more compact structure can be achieved in the vehicle width direction, and riding posture can be improved.

The main frames 14, 14 are formed into a vertically long shape in the cross-sectional view, and the front mounting portions 79, 79 and the rear mounting portions 80, 80 on the inner surfaces 78, 78 are provided on the lower sides having the vertically long shape of the main frames 14, 14, and the inner surfaces 78, 78 above the front mounting portions 79, 79 and the rear mounting portions 80, 80 are respectively provided with the reinforcing plates 87, 88 for reinforcing the main frames 14, 14. For this reason, the engine hangers 28, 28 can be shortened in the vertical direction to achieve the reduction in weight and the improvement in the rigidity. Since the positions applied with the high stress above the front mounting portions 79, 79 and the rear mounting portions 80, 80 can be reinforced by the reinforcing plates 87, 88, the rigidity of the main frames 14, 14 can be secured.

Each of the main frames 14, 14 has the shape that is narrowed in the vehicle width direction from substantially the center position in the longitudinal direction toward the side of the pivot shaft 22, the front mounting portions 79, 79 and the rear mounting portions 80, 80 are provided in the two positions in the longitudinal direction with respect to the respective main frames, that is, provided in the four positions in total, and the rear mounting portions 80, 80 in the two rear positions are positioned inward in the vehicle width direction from the front mounting portions 79, 79 in the two front positions. For this reason, the engine 20 can be supported by the engine hangers 28, 28 corresponding to the main frames 14, 14 having the shape narrowed in the vehicle width direction toward the side of the pivot shaft 22.

Further, since each of the engine hangers 28, 28 has a substantially V shape in the side view, volume of the engine hangers 28, 28 can be reduced, and also the rigidity of the upper portions of the engine hangers 28, 28 is moderately reduced to allow the deflection of the engine hangers 28, 28.

Since the material of each of the engine hangers 28, 28 is aluminum alloy, the appearance quality is excellent. Also, since the aluminum alloy has excellent formability, the shape is easily changed to easily adjust the rigidity. Further, each of the engine hangers 28, 28 has substantially the U shape in the cross-sectional view, the lightening effect can be obtained, and the reduction in weight can be achieved.

The engine hangers 28, 28 have electrical component stays 83d, 83d that extend horizontally toward the inner side in the vehicle width direction, and the electrical component stays 83d, 83d support the brake unit storage portion 56. Therefore, it is not necessary to provide the exclusive component for supporting the brake unit storage portion 56, and the number of components is reduced to simplify the structure.

REFERENCE SIGNS LIST

1 . . . Motorcycle (saddle-ride type vehicle)
13 . . . Head pipe
14, 14 . . . Main frame
20 . . . Engine
22 . . . Pivot shaft (pivot)
28, 28 . . . Engine hanger (bracket)
56 . . . Brake unit storage portion (electrical component case)
78, 78 . . . Inner surface
79, 79 . . . Front mounting portion (mounting portion, mounting portion provided in each of two front positions)
80, 80 . . . Rear mounting portion (mounting portion, mounting portion provided in each of two rear positions)
83d, 83d . . . Electrical component stay (inner projecting portion)
87, 87 . . . Reinforcing plate (reinforcing member)
88, 88 . . . Reinforcing plate (reinforcing member)

We claim:

1. A vehicle body frame, comprising:
   a head pipe disposed at a front end of the vehicle body frame;
   a pair of center frames comprising pivot holes that are configured to receive a pivot shaft in a vehicle body frame width direction; and
   a pair of right and left main frames that are branched to right and left from the head pipe and extends rearward, of the vehicle body frame,
   wherein the pair of right and left main frames is configured to support an engine that is disposed substantially in a center position between the head pipe and the pivot shaft in a side view of the vehicle body frame,
   wherein only inner surfaces in the vehicle body frame width direction of the pair of right and left main frames comprise a pair of left and right mounting portions that project inward in the vehicle body frame width direction,
   wherein the mounting portions are directly mounted to the pair of right and left main frames with brackets that are attached to the mounting portions, the brackets extending downward toward a bottom of the vehicle body frame,
   wherein the brackets are configured to support the engine,
   wherein each bracket comprises an inner projecting portion that extends horizontally toward an inner side of the vehicle body frame in the vehicle body frame width direction,
   wherein the inner projecting portion is integral with each bracket,
   wherein each bracket and inner projecting portion constitute one single piece, and
   wherein the inner projecting portion comprises a vertically aligned hole.

2. The vehicle body frame according to claim 1,
   wherein the pair of right and left main frames has a vertically long shape in a cross-sectional view of the vehicle body frame,
   wherein the mounting portions on the inner surfaces are disposed at lower portions of the pair of right and left main frames having a vertically long shape in a cross-sectional view of the vehicle body frame, and
   wherein at least a portion of the inner surfaces above the mounting portions comprise reinforcing members that are configured to reinforce the pair of right and left main frames.

3. The vehicle body frame according to claim 1,
   wherein the pair of right and left main frames has a shape that is narrowed in the vehicle body frame width direction from substantially the center position of the pair of right and left main frames toward a side of the pivot shaft, wherein the mounting portions are disposed in two positions in a longitudinal direction with respect to each respective main frame, and are disposed in four positions in total with respect to the pair of right and left main frames, wherein the mounting portions are disposed in two rear positions of the vehicle body frame and two front positions of the vehicle body frame in the vehicle body frame width direction.

4. The vehicle body frame according to claim 3, wherein the brackets have a substantially V shape in a side view of the vehicle body frame.

5. The vehicle body frame according to claim 4, wherein material of each of the pair of right and left main frames is steel, wherein material of each of the brackets is aluminum, and wherein the brackets have a substantially U shape in the cross-sectional view of the vehicle body frame.

6. The vehicle body frame according to claim 1, wherein the inner projecting portions are configured to support an electrical component case.

7. The vehicle body frame according to claim 1, wherein the vehicle body frame is configured for use in a saddle-ride type vehicle.

8. A vehicle body frame for a vehicle, comprising:

head pipe means for receiving a steering shaft, the head pipe means disposed at a front end of the vehicle body frame;

a pair of center frame means for supporting front and rear portions of the vehicle body frame, the pair of center frame means comprising pivot holes that are configured to receive a pivot shaft in a vehicle body frame width direction; and a pair of right and left main frame means for supporting an engine of the vehicle, the pair of right and left main frame means branched to right and left from the head pipe means and extend rearward, of the vehicle body frame, wherein the engine is supported substantially in a center position between the head pipe means and the pivot shaft in a side view of the vehicle body frame, wherein only inner surfaces in the vehicle body frame width direction of the pair of right and left main frame means comprise a pair of left and right mounting portions that project inward in the vehicle body frame width direction, wherein the mounting portions are directly mounted to the pair of right and left main frame means with brackets that are attached to the mounting portions, the brackets extending downward toward a bottom of the vehicle body frame, wherein the brackets are configured to support the engine, wherein each bracket comprises an inner projecting portion that extends horizontally toward an inner side of the vehicle body frame in the vehicle body frame width direction, wherein the inner projecting portion is integral with each bracket, wherein each bracket and inner projecting portion constitute one single piece, and wherein the inner projecting portion comprises a vertically aligned hole.

9. The vehicle body frame for a vehicle according to claim 8, wherein the pair of right and left main frame means has a vertically long shape in a cross-sectional view of the vehicle body frame, wherein the mounting portions on the inner surfaces are disposed at lower portions of the pair of right and left main frame means having a vertically long shape in a cross-sectional view of the vehicle body frame, and wherein at least a portion of the inner surfaces above the mounting portions comprise reinforcing members that are configured to reinforce the pair of right and left main frame means.

10. The vehicle body frame according to claim 8, wherein the pair of right and left main frame means has a shape that is narrowed in the vehicle body frame width direction from substantially the center position of the pair of right and left main frame means toward a side of the pivot shaft, wherein the mounting portions are disposed in two positions in a longitudinal direction with respect to the pair of right and left main frame means, and are disposed in four positions in total with respect to the pair of right and left main frame means, wherein the mounting portions are disposed in two rear positions of the vehicle body frame and two front positions of the vehicle body frame in the vehicle body frame width direction.

11. The vehicle body frame according to claim 10, wherein the brackets have a substantially V shape in a side view of the vehicle body frame.

12. The vehicle body frame according to claim 11, wherein material of each of the pair of right and left main frame means is steel, wherein material of each of the brackets is aluminum, and wherein the brackets have a substantially U shape in the cross-sectional view of the vehicle body frame.

13. The vehicle body frame according to claim 8, wherein the inner projecting portions are configured to support an electrical component case.

14. The vehicle body frame according to claim 8, wherein the vehicle body frame is configured for use in a saddle-ride type vehicle.

15. An engine supporting structure, the supporting structure comprising:

a pair of right and left main frames configured to support an engine, wherein the pair of right and left main frames are branched to right and left from a front portion of the engine supporting structure to a rear portion of the engine supporting structure, wherein only inner surfaces in an engine supporting structure width direction of the right and left main frames comprise a pair of left and right mounting portions that project inward in the engine supporting structure width direction, wherein the mounting portions are directly mounted to the pair of right and left main frames with brackets that are attached to the mounting portions, the brackets extending downward toward a bottom of the engine supporting structure, wherein the brackets are configured to support the engine, wherein each bracket comprises an inner projecting portion that extends horizontally toward an inner side of the engine supporting structure in the engine supporting structure width direction, and wherein the inner projecting portion is integral with each bracket, wherein each bracket and inner projecting portion constitute one single piece, and wherein the inner projecting portion comprises a vertically aligned hole.

16. The engine supporting structure according to claim 15,
  wherein the pair of right and left main frames have a vertically long shape in a cross-sectional view of the engine supporting structure,
  wherein the mounting portions on the inner surfaces are disposed at lower portions of the pair of right and left main frames having a vertically long shape in a cross-sectional view of the engine supporting structure, and
  wherein at least a portion of the inner surfaces above the mounting portions comprise reinforcing members that are configured to reinforce the pair of right and left main frames.

17. The engine supporting structure according to claim 15,
  wherein the pair of right and left main frames have a shape that is narrowed in the engine supporting structure width direction from substantially the center position of the pair of right and left main frames toward a rear side of the engine supporting structure,
  wherein the mounting portions are disposed in two positions in a longitudinal direction with respect to each respective main frame, and are disposed in four positions in total with respect to the pair of right and left main frames,
  wherein the mounting portions are disposed in two rear positions of the engine supporting structure and two front positions of the engine supporting structure in the engine supporting structure width direction.

18. The engine supporting structure according to claim 17,
  wherein the brackets have a substantially V shape in a side view of the engine supporting structure.

19. The engine supporting structure according to claim 18,
  wherein material of each of the pair of right and left main frames is steel,
  wherein material of each of the brackets is aluminum, and
  wherein the brackets have a substantially U shape in the cross-sectional view of the engine supporting structure.

20. The engine supporting structure according to claim 15,
  wherein the inner projecting portions are configured to support an electrical component case.

* * * * *